United States Patent
McCrackin et al.

(10) Patent No.: US 9,247,223 B2
(45) Date of Patent: Jan. 26, 2016

(54) REDUCE OPERATING ENVIRONMENT EFFECT USING MULTIPLE CAMERAS

(71) Applicant: Research In Motion Limited, Waterloo (CA)

(72) Inventors: Laura McCrackin, Hamilton (CA); Sung Ho Hong, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 146 days.

(21) Appl. No.: 13/749,800

(22) Filed: Jan. 25, 2013

(65) Prior Publication Data

US 2014/0211041 A1    Jul. 31, 2014

(51) Int. Cl.
| | |
|---|---|
| *H04N 9/73* | (2006.01) |
| *H04N 5/232* | (2006.01) |
| *H04N 13/02* | (2006.01) |
| *H04N 5/353* | (2011.01) |
| *H04N 5/235* | (2006.01) |
| *H04N 5/225* | (2006.01) |
| *H04N 13/04* | (2006.01) |

(52) U.S. Cl.
CPC ............ *H04N 9/735* (2013.01); *H04N 5/2258* (2013.01); *H04N 5/2353* (2013.01); *H04N 5/2357* (2013.01); *H04N 5/23206* (2013.01); *H04N 5/23212* (2013.01); *H04N 5/23219* (2013.01); *H04N 5/23245* (2013.01); *H04N 5/353* (2013.01); *H04N 13/0239* (2013.01); *H04N 13/0285* (2013.01); *H04N 13/04* (2013.01)

(58) Field of Classification Search
CPC ........................ H04N 9/735; G09G 2320/0666
USPC ....................................................... 348/223.1
See application file for complete search history.

(56) References Cited

U.S. PATENT DOCUMENTS

| | | |
|---|---|---|
| 4,734,756 A | 3/1988 | Butterfield et al. |
| 6,522,353 B1 | 2/2003 | Saito et al. |
| 6,529,235 B1 | 3/2003 | Tseng |
| 7,151,563 B2 | 12/2006 | Higuchi |
| 7,652,717 B2 | 1/2010 | Enge et al. |
| 8,013,908 B2 | 9/2011 | Chou |
| 2003/0231248 A1 | 12/2003 | Yuyama et al. |
| 2008/0231726 A1 | 9/2008 | John |
| 2009/0015689 A1 | 1/2009 | Murayama |
| 2010/0013952 A1* | 1/2010 | Kwon et al. ............... 348/223.1 |
| 2010/0149372 A1* | 6/2010 | Silverstein ................ 348/223.1 |

(Continued)

OTHER PUBLICATIONS

Chikane, Varsha, et al., "Automatic White Balance for Digital Still Cameras", Journal of Information Science and Engineering 22, 497-509 (2006), accepted Jun. 30, 2005.
Chiu, L., et al., "Calibration-Based Auto White Balance Method for Digital Still Camera", accepted Jun. 5, 2008.
EPO, Extended European Search Report relating to application No. 13152723.6 dated Jul. 12, 2013.

(Continued)

*Primary Examiner* — Nelson D. Hernández Hernández
(74) *Attorney, Agent, or Firm* — ROWAND LLP (57) ABSTRACT

Methods and devices for automatically white balancing an image are described. In one embodiment, a method includes: capturing a first image using a first camera associated with an electronic device and capturing a second image using a second camera associated with the electronic device, the first image and the second image being temporally related; determining one or more white balance correction values for the first image by analyzing the first image and the second image, the white balance correction value representing the effect of lighting conditions on the first image and the second image; and correcting one or more images captured by the first camera based on the white balance correction value.

18 Claims, 6 Drawing Sheets

(56) References Cited

U.S. PATENT DOCUMENTS

2011/0255786 A1  10/2011  Hunter
2012/0050492 A1   3/2012  Moriwake
2012/0081553 A1   4/2012  Cote et al.
2012/0105579 A1*  5/2012  Jeon et al. .................. 348/38

OTHER PUBLICATIONS

Ja-Won Seo et al: "A novel stereoscopic image processing pipeline", Consumer Electronics (ICCE), 2013 IEEE International Conference on, IEEE, Jan. 11, 2013, pp. 260-261, XP032348756.

* cited by examiner

REDUCE OPERATING ENVIRONMENT EFFECT USING MULTIPLE CAMERAS

TECHNICAL FIELD

The present disclosure relates to image enhancement and, more particularly, to methods and devices for reducing the effect of an operating environment on an image.

BACKGROUND

Digital cameras may be affected by the operating environment in which the digital camera is located when capturing an image. For example, the colours in an image may vary depending on a light source that is exposed to the camera. An image captured in sunlight may have different colouring than an image captured near incandescent or fluorescent lighting. For example, an image may have a bluish cast if it is captured under fluorescent lighting. White balancing is the process of removing incorrect colouring in an image so that objects that appear white in person are white in the image. White balancing may be used to compensate for the effect of a light source on an image.

Digital cameras may also be affected by flicker. Flicker is caused due to the presence of light sources that are powered by alternating current (AC) mains. Such light sources may emit light that varies in brightness based on the mains frequency of the AC mains. Such variations are not detected by the human eye, but may be detected by an image sensor of a digital camera. Such variations may produce a series of alternating dark and light bands in a captured image.

Thus, the environment in which a digital camera operates may affect images produced by that digital camera. In particular, the lighting conditions may affect the resulting image and may, in at least some cases, cause images to be captured that have undesirable effects.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one example aspect, the present application describes a method of automatically white balancing an image. The method includes: capturing a first image using a first camera associated with an electronic device and capturing a second image using a second camera associated with the electronic device, the first image and the second image being temporally related; determining one or more white balance correction values for the first image by analyzing the first image and the second image, the white balance correction value representing the effect of lighting conditions on the first image and the second image; and correcting one or more images captured by the first camera based on the white balance correction value.

In another example aspect, the present application describes an electronic device. The electronic device includes a first camera and a second camera. The electronic device also includes a processor connected to the first camera and the second camera. The processor is configured to: capture a first image using the first camera and capture a second image using the second camera, the first image and the second image being temporally related; determine one or more white balance correction values for the first image by analyzing the first image and the second image, the white balance correction value representing the effect of lighting conditions on the first image and the second image; and correct one or more images captured by the first camera based on the white balance correction value.

In another example aspect, the present application describes a method for detecting the presence of a flicker source at an electronic device. The method includes: providing a selectable operating mode on the electronic device for capturing a two dimensional image using the first camera; and when the electronic device is operating in the operating mode for capturing a two dimensional image using the first camera, using a second camera to detect the presence of a flicker source.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

According to some example embodiments described herein, methods and devices for auto-white balancing are described. Digital cameras may be affected by an operating environment in which the digital camera is located when capturing an image. For example, the colours in an image may vary depending on a light source that is exposed to the camera. An image captured in sunlight may have different colouring than an image captured near incandescent lighting. An image may have a bluish cast if it is captured under fluorescent lighting. White balancing is the process of removing incorrect colouring in an image so that objects that appear white in person are white in the image. White balancing may be used to compensate for the effect of a light source on an image.

According to some example embodiments of the present disclosure, auto-white balancing on a first image produced using a first camera may be performed utilizing both the first image and also utilizing another image. More particularly, in at least some embodiments, such white balancing may be performed using a second image obtained at a second camera. The first image and the second image may be captured at approximately the same time. The second image is used to assist with white balancing the first image. More particularly, since the second image was captured at approximately the same time as the first image, it may be exposed to the same lighting as the first image and may, therefore, suffer from a similar white imbalance. Information from the second image may, therefore, be useful in white balancing the first image. The capture and use of the second image in order to correct the first image may be hidden from the user. That is, the user may not know that the second camera is being utilized. For example, the user may be operating the device in a mode where it appears that only the first camera is being used.

According to some example embodiments of the present disclosure, a second camera is utilized for detecting flicker. Digital cameras may be affected by flicker due to the presence of light sources that are powered by alternating current (AC) mains. Such light sources may emit light that varies in brightness based on the mains frequency of the AC mains. Such variations are not detected by the human eye, but may be detected by an image sensor of a digital camera. Such variations may produce a series of alternating dark and light bands.

When a user is operating an electronic device in an operating mode in which a two dimensional image may be captured using a first camera, a second camera may be used to detect the presence of a flicker source. For example, an exposure time of the second camera may be set to a value that is incompatible with a local mains frequency. Then, an image may be captured using the second camera and the image may be analyzed to determine whether an effect associated with the presence of flicker is present in the image.

Thus, in at least some embodiments, a second camera may be utilized to help prevent unwanted effects in images captured using a first camera that may be caused by environmental operating conditions in the vicinity of the cameras. For example, unwanted effects due to nearby lighting sources may be prevented.

Example Electronic Device

Figure 1:
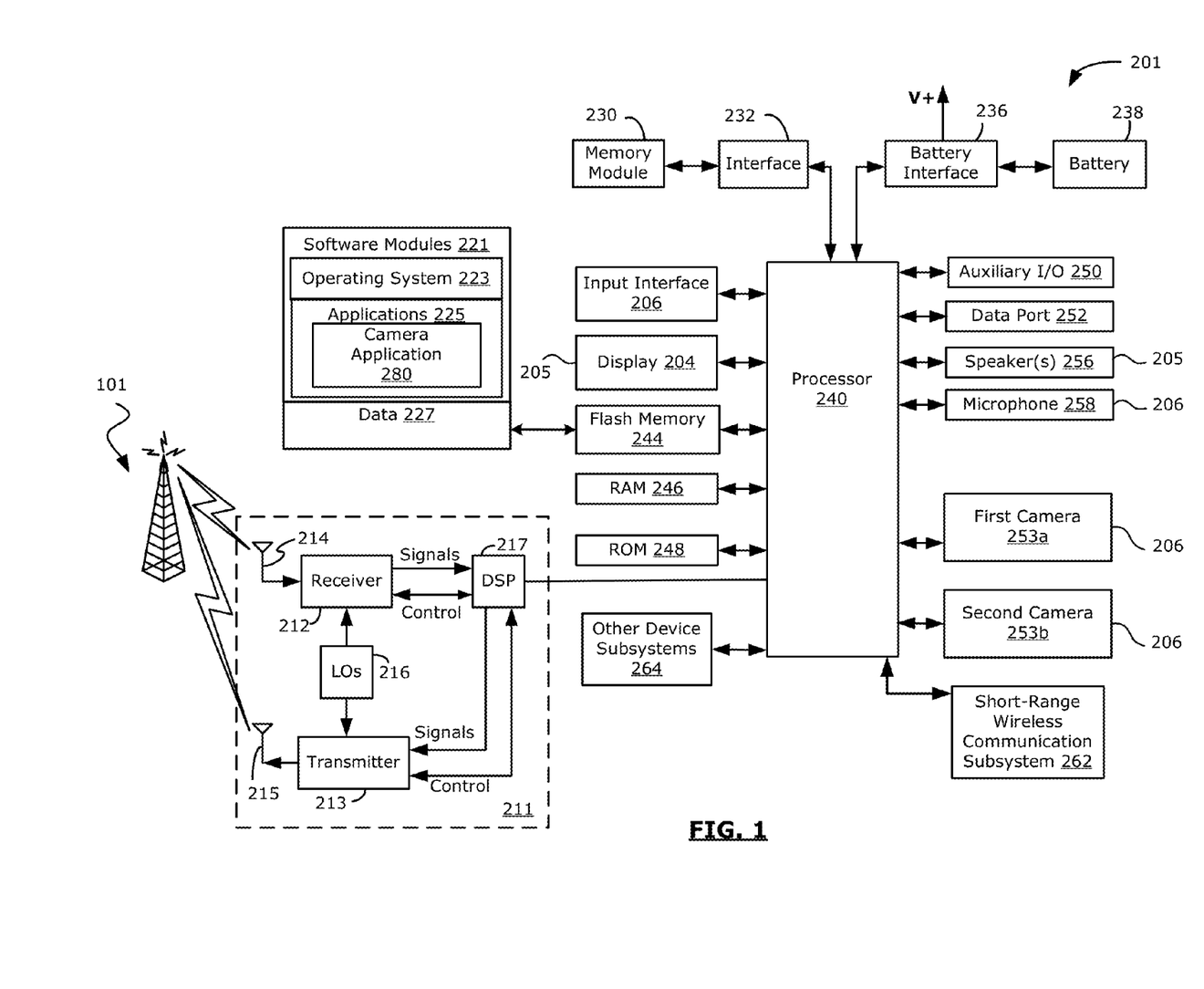
FIG. 1 is a block diagram illustrating an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a first camera 253a, a second camera 253b, a microphone 258, a keyboard (not shown), control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range wireless communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The electronic device 201 may include a communication subsystem 211 which allows the electronic device 201 to communicate over a wireless network 101. The communication subsystem 211 includes a receiver 212, a transmitter 213, and associated components, such as one or more antenna elements 214, 215, local oscillators (LOs) 216, and a processing module such as a digital signal processor (DSP) 217. The antenna elements 214, 215 may be embedded or internal to the electronic device 201 and a single antenna may be shared by both receiver 212 and transmitter 213. The particular design of the wireless communication subsystem 211 depends on the wireless network 101 in which the electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver 212 and transmitter 213 control. For example, the gains applied to communication signals in the receiver 212 and the transmitter 213 may be adaptively controlled through automatic gain control algorithms implemented in the DSP 217.

In at least some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a first camera 253a and a second camera 253b. The cameras 253a, 253b are capable of capturing camera data, such as images, in the form of still photo and/or motion data. The camera data may be captured in the form of an electronic signal which is produced by an image sensor associated with each of the cameras 253a, 253b.

In some embodiments, the cameras are oriented in generally the same direction. In at least some such example embodiments, the cameras 253a, 253b may be operable in a three-dimensional operating mode. For example, the cameras 253a, 253b may, in at least one operating mode, be collectively capable of capturing stereoscopic images for display. That is, the cameras 253a, 253b may collectively produce stereoscopic image data which defines a stereoscopic image. Stereoscopic images may provide an illusion of depth in the images to a user (i.e. three dimensional (3-D) images).

Where the cameras 253a, 253b may be operable to produce stereoscopic image data, the cameras 253a, 253b are oriented in generally the same direction. For example, the cameras 253a, 253b may both be rear-facing. That is, the cameras 253a, 253b may be both arranged to capture an image of a subject on a rear side of the electronic device 201. In other embodiments in which the cameras 253a, 253b are operable to produce stereoscopic image data, the cameras may both be front-facing. That is, the cameras 253a, 253b may be both arranged to capture an image of a subject on a front side of the electronic device 201.

Where the cameras 253a, 253b may be operable to produce stereoscopic image data, the first camera 253a and the second camera 253b are mounted in spaced relation to one another. That is, there may be a space between the cameras 253a, 253b to allow the first camera 253a and the second camera 253b to capture stereoscopic images. The distance between the cameras 253a, 253b may be approximately the same as the distance between a standard person's eyes (which is around 6.35 cm). In at least some example embodiments, the distance between the cameras 253a, 253b may be smaller or larger than the distance between a person's eyes. A larger distance between the cameras 253a, 253b may allow for capturing stereoscopic images that produces an enhanced effect of stereoscopy for a user.

Where the cameras 253a, 253b are offset from one another, so too are the images which they produce. That is, an image captured by the first camera 253a is offset from the image captured by the second camera 253b. The image from the first camera 253a is captured at a different position than the image from the second camera 253b due to the positioning of the first camera 253a and the second camera 253b. The offset between the images is defined by the distance (referred to as the intra-axial distance) between the first camera 253a and the second camera 253b.

Accordingly, in at least some embodiments, the first camera 253a and the second camera 253b may be operable to produce stereoscopic image data. Such stereoscopic image data includes images produced using the first camera 253a and images produced using the second camera 253b. The images may be captured at the same time or approximately the same time, but may be offset in appearance due to the spacing between the cameras 253a, 253b.

In embodiments in which the first camera 253a and the second camera 253b are operable to capture stereoscopic image data, the electronic device 201 may provide a further operating mode which allows the first camera 253a and/or the second camera 253b to capture non-stereoscopic images (i.e. two-dimensional (2-D) images). For example, the electronic device 201 may provide a selectable operating mode for capturing a two dimensional image using the first camera 253a. As will be discussed in greater detail below, when operating in the two-dimensional operating mode for capturing a 2D image using the first camera 253a, the second camera 253b may be used for preventing unwanted effects due to environmental operating conditions. For example, the second camera 253b may, in at least some embodiments, be used to assist with auto-white balancing. In some embodiments, the second camera 253b may be used to detect the presence of a flicker source.

In embodiments in which the cameras 253a, 253b may be used to obtain stereoscopic image data, they may both be front facing cameras or may both be configured as rear facing cameras. In other embodiments, the cameras 253a, 253b may be disposed on opposite sides of the electronic device 201. For example, one of the cameras may be configured as a front facing camera and another of the cameras may be configured as a rear facing camera.

Front facing cameras are provided by cameras 253a, 253b which are located to obtain images near a front face of the electronic device 201. The front face is typically the face on which a main display 204 is mounted. That is, when a front facing camera is provided on the electronic device 201, the display 204 is configured to display content which may be viewed from a side of the electronic device 201 where the front facing camera 253a, 253b is directed.

The front facing camera may be located above or below the display 204. In at least some example embodiments, the front facing camera 253a, 253b may be provided in a central location relative to the display 204 to facilitate image acquisition of a face. For example, a front facing camera 253a, 253b may be located centrally above the display 204.

Rear facing cameras are provided by cameras 253a, 253b which are located to obtain images of a subject near a rear face of the electronic device 201. The rear face is typically a face which does not include the main display 204 of the electronic device 201. In at least some embodiments, the electronic device 201 may operate in an operating mode in which the display 204 acts as a viewfinder displaying images associated with camera data obtained at one or both of the rear facing cameras.

A rear facing camera may obtain images which are not within the field of view of a front facing camera. The field of view of the front facing and rear facing cameras may generally be in opposing directions.

While FIG. 1 illustrates two cameras (a first camera 253a and a second camera 253b), the electronic device 201 may include more than two cameras 253a, 253b. For example, in at least some example embodiments, the electronic device 201 may include three or more cameras. For example, two of the cameras may be oriented on one side of the electronic device 201 and may be operable in a stereoscopic operating mode and another of the cameras may be oriented on another side of the electronic device 201.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

The electronic device 201 also includes a power source such as a battery 238, which may include one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, camera data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using an input interface 206 in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, internet browser application, a camera application 280, a voice communication (i.e. telephony) application, a mapping application, and/or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the cameras 253a, 253b to allow the processor 240 to receive electronic signals representing camera data from the cameras 253a, 253b.

In at least some embodiments, the software modules 221 may include one or more camera applications 280 or software modules which are configured for handling the electronic signals representing camera data from the cameras 253a, 253b. The camera application 280 may, for example, be configured to provide a viewfinder on the display 204 by displaying, in real time or near real time, images defined in the electronic signals received from the cameras 253a, 253b. The camera application 280 may also be configured to capture images or videos by storing images or videos defined by the electronic signals received from the cameras 253a, 253b. For example, the camera application 280 may be configured to store the images or videos to memory, for example the flash memory 244, of the electronic device 201. The images may be stored in various formats including JPEG, RAW, BMP, etc.

The camera application 280 may also be configured to control options or preferences associated with the cameras 253a, 253b. For example, the camera application 280 may be configured to control camera lens apertures and/or shutter speeds associated with the cameras 253a, 253b. The control of such features may, in at least some example embodiments, be automatically performed by the camera application 280 based on output received from a light exposure meter, or based on the operating mode of the camera application 280 (such as whether the electronic device is operating in a 2-D operating mode or a 3-D operating mode), or based on other criteria.

The camera application 280 may, in various embodiments, control any one or more of a number of various camera related features and options. For example, in at least some example embodiments, the camera application 280 may be configured to control a flash associated with the cameras 253a, 253b and/or to control zooms associated with the cameras 253a, 253b. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280 may, in at least some example embodiments, provide image stabilization for the cameras 253a, 253b. Image stabilization may reduce blurring associated with movement of the cameras 253a, 253b.

In at least some embodiments, the camera application 280 may be configured to focus the cameras 253a, 253b on a subject (i.e. an identifiable item, such as an individual or thing). More particularly, the camera application 280 may be configured to control actuators of the cameras 253a, 253b to move lenses (a lens may be comprised of one or more lens elements) in the cameras 253a, 253b relative to image sensors in the cameras 253a, 253b (i.e. vary the focus distance of the cameras 253a, 253b). The focus distance is a measure of the strength of convergence (or divergence) of light for magnification, and may be the distance between the image sensor and the lenses). For example, when capturing images of subjects which are very far from the cameras 253a, 253b, the camera application 280 may control the actuators to cause the actuators to move the lenses away from the image sensors (i.e. increase the focus distance to magnify the subject).

In at least some embodiments, the camera application 280 may provide for auto-focusing capabilities. For example, the camera application 280 may analyze received electronic signals to determine whether the images captured by the cameras 253a, 253b are in focus. That is, the camera application 280 may determine whether the images defined by electronic signals received from the cameras 253a, 253b are focused properly on the subject of such images. The camera application 280 may, for example, make this determination based on the sharpness of such images. If the camera application 280 determines that the images are not in focus, then the camera application 280 may cause the processor 240 to adjust one or more of the actuators which controls the lenses to focus the images.

In at least some example embodiments, the camera application 280 may allow the cameras 253a, 253b to be operated in a variety of operating modes. In some embodiments, the camera application 280 may provide a three dimensional (3-D) operating mode. In this operating mode, similarly-oriented cameras 253a, 253b may collectively capture stereoscopic image data. In such example embodiments, the camera application 280 may be configured to process electronic signals of images captured by cameras 253a, 253b for stereoscopic display. That is, the camera application 280 may analyze stereoscopic images defined by the electronic signals received from the cameras 253a, 253b. In some example embodiments, in the 3-D operating mode the camera application 280 may be configured to display an image obtained from the first camera 253a and an image obtained from the second camera 253b separately to a left eye and a right eye of a user viewing the display 204 (i.e. to display a 3-D image).

In some example embodiments, the camera application 280 may be configured to operate in a two dimensional ("2-D") operating mode. In the 2-D operating mode, only one of the cameras appears to be active to the user. For example, in accordance with a user selection of an option to capture an image using the first camera 253a, the camera application 280 may configure the first camera 253a to capture a 2-D image for display and/or storage. In this mode, the user may only view the images produced from the first camera 253a. That is, in the 2-D operating mode, only one camera appears to capture an image at any given time. For example, in one mode, only the first camera 253a may appear to capture a 2-D image while the second camera 253b does not appear to a user to capture any images.

In some embodiments, when a user has selected an operating mode which does not appear to engage a second camera 253b, the camera application 280 may use the second camera 253b to prevent or reduce the unwanted effects that may be caused by environmental operating conditions.

For example, as will be discussed in greater detail below with reference to FIGS. 5 to 7, in some embodiments, when the electronic device is operating in a 2-D operating mode in which the first camera 253a is configured to capture an image, the second camera 253b may be used to assist with white balancing correction. The use of the second camera 253b for this purpose may not be apparent to a user. That is, to the user, it may appear that the second camera 253b is not being utilized.

In some embodiments, as will be discussed in greater detail below with reference to FIG. 8, when the electronic device is operating in a 2-D operating mode in which the first camera 253a is configured to capture an image, the second camera 253b may be used to attempt to detect the presence of a flicker source. That is, the second camera 253b may be used to attempt to determine whether there is something in the vicinity of the electronic device 201 which may cause a flicker affect in captured images. The use of the second camera 253b for this purpose may not be apparent to a user.

In at least some example embodiments, the operating system 223 may perform some or all of the functions of the camera application 280. In other example embodiments, the functions or a portion of the functions of the camera application 280 may be performed by one or more other applications.

Further, while the camera application 280 has been illustrated as a stand-alone application, in at least some example embodiments, the functions of the camera application 280 may be provided by a plurality of software modules. In at least some example embodiments, these software modules may be divided among multiple applications.

While FIG. 1 illustrates a camera application 280 associated with a main processor 240, in some embodiments, one or more of the functions or features of the camera application 280 may be performed by an image signal processor. The image signal processor may be a dedicated processor that receives data from one or more of the cameras. The image signal processor may control the cameras 253a, 253b. In at least some embodiments, the image signal processor may provide captured images to the main processor and/or may store such images in memory.

Example Electronic Device

As discussed above, the electronic device 201 may take a variety of forms. For example, in at least some example embodiments, the electronic device 201 may be a smartphone.

Figure 2:
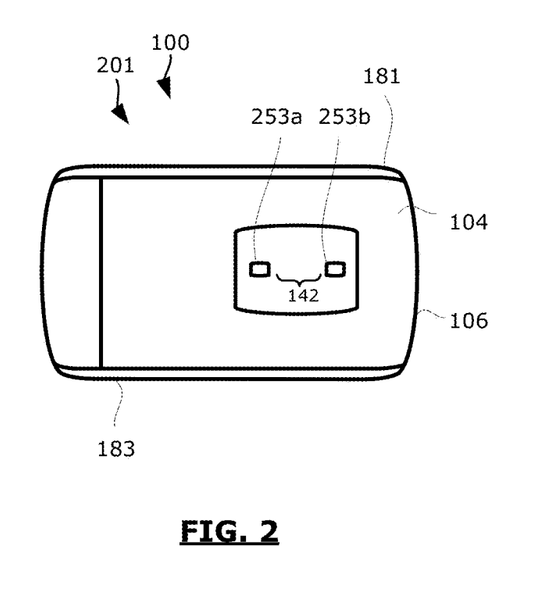
FIG. 2 is a rear view of an example electronic device in accordance with example embodiments of the present disclosure.

Referring to FIG. 2, an example smartphone 100 includes a first camera 253a and a second camera 253b. In the embodiment of FIG. 2, the cameras 253a, 253b are rear facing cameras 253a, 253b, disposed on a rear side 104 of the smartphone 100. That is, the rear facing cameras 253a, 253b are located on a side of the smartphone 100 which does not include the display 204.

The rear facing cameras may be located on a central axis of the smartphone 100 which is located midway between a top side 181 and a bottom side 183 of the electronic device 201 when the electronic device 201 is held in a landscape orientation where its width is longer than its height. The rear facing cameras 253a, 253b are located so that they may capture images of subjects which are located in the rear of the electronic device 201 and/or surrounding the rear side 104 of the electronic device 201. In at least some example embodiments, the electronic device 201 may operate in an operating mode in which the display 204, on the front side 102 of the electronic device 201, acts as a viewfinder displaying image data associated with the rear facing cameras 253a, 253b on the rear side 104 of the electronic device 201.

The rear facing cameras 253a, 253b are spaced apart by a distance 142 in order to capture stereoscopic images. In at least some example embodiments, the distance 142 between the rear facing cameras 253a, 253b is greater than the distance 142 illustrated in FIG. 2. For example, the first camera 253a may be located at one end of the rear side 104 (e.g. the leftmost end illustrated in FIG. 3) of the electronic device 201 and the second camera 253b may be located at the other end of the rear side 104 of the electronic device 201 (e.g. the rightmost end illustrated in FIG. 3).

In at least some example embodiments, the smartphone 100 may also include one or more front facing cameras instead of, or in addition to, the rear facing cameras 253a, 253b. The front facing cameras may be located on the front side of the smart phone 100. The front facing cameras are located so that they may capture images of subjects which are located in front of and/or surrounding the front side of the smartphone 100.

The smartphone 100 may include the components discussed above with reference to FIG. 1 or a subset of those components. The smartphone 100 includes a housing 106 which houses at least some of the components discussed above with reference to FIG. 1.

Figure 3:
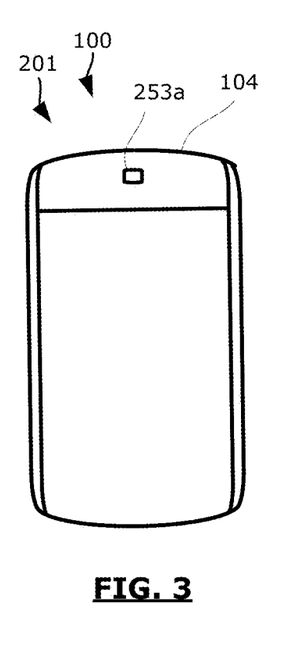
FIG. 3 is a rear view of an example electronic device in accordance with example embodiments of the present disclosure.
Figure 4:
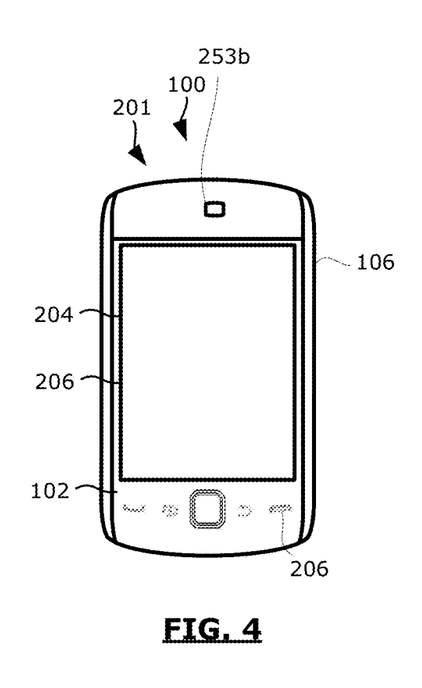
FIG. 4 is a front view of an example electronic device in accordance with example embodiments of the present disclosure.

Referring now to FIGS. 3 and 4, an alternative arrangement of the first camera 253a and the second camera 253b is illustrated. As illustrated in FIG. 3, in some embodiments, the rear side 104 of the electronic device 201 may include the first camera 253a, but not the second camera 253b. In at least some such embodiments, the second camera 253b may be disposed on the front side of the electronic device 201. One such embodiment is illustrated in FIG. 4.

Referring now to FIG. 4, a front view of an example electronic device 201 which is a smartphone 100 is illustrated.

In the example embodiment illustrated, the smartphone 100 includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 106.

The example smartphone 100 also includes other input interfaces 206 such as one or more buttons, keys or navigational input mechanisms. In the example embodiment illustrated, at least some of these additional input interfaces 206 are disposed for actuation at a front side 102 of the smartphone.

In the example of FIG. 4, the second camera 253b is disposed on the front side 102 of the electronic device 201. More particularly, the second camera 253b is disposed on the side of the electronic device 201 that also contains the display 204. The second camera 253b is disposed above the display in the example illustrated. The second camera 253b is disposed in a position in which it may acquire an image of a user operating the electronic device 201.

As illustrated above, the first camera 253a and the second camera 253b may be disposed in any one of a number of various arrangements on the electronic device. The arrangements illustrated in FIGS. 2 to 4 are not exhaustive and other arrangements may be used in other embodiments. For example, in some embodiments, both the front side 102 (FIG. 4) and the rear side 104 (FIGS. 2 and 3) may include multiple cameras, allowing stereoscopic images to be captured at either side of the electronic device 201. Further, in some embodiments, one of the sides of the electronic device 201 may have a single camera and another of the sides of the electronic device 201 may have multiple cameras. For example, a front face of the type described with reference to FIG. 4 may be utilized on an electronic device 201 having a rear side 104 of the type described with reference to FIG. 2.

Reducing Effect of Operating Environment

Reference will now be made to FIGS. 5 to 8 in which example methods 500, 600, 700, 800 of reducing the effect of an operating environment on an image are illustrated in flowchart form. The electronic device 201 may be configured to perform any one of more of the methods 500, 600, 700, 800 of FIGS. 5 to 8. In at least some example embodiments, the processor 240 of the electronic device 201 is configured to perform one or more of the methods 500, 600, 700, 800 of FIGS. 5 to 8. One or more applications 225 or modules on the electronic device 201 may contain computer readable instructions which cause the processor 240 of the electronic device 201 to perform any one or more of the methods 500, 600, 700, 800 of FIGS. 5 to 8. In at least some example embodiments, the camera application 280 stored in memory of the electronic device 201 is configured to perform one or more of the methods 500, 600, 700, 800 of any one or more of FIGS. 5 to 8. More particularly, the camera application 280 may contain computer readable instructions which, when executed, cause the processor 240 to perform the methods 500, 600, 700, 800 of FIGS. 5 to 8. It will be appreciated that the methods 500, 600, 700, 800 of FIGS. 5 to 8 may, in at least some example embodiments, be provided by other software applications 225 or modules apart from those specifically discussed above; for example the operating system 223. Accordingly, any features which are referred to as being performed by the electronic device 201 may be performed by any one or more of the software applications 225 or modules referred to above or other software modules. In at least some example embodiments, a portion of one or more of the methods 500, 600, 700, 800 of FIGS. 5 to 8 may be performed by or may rely on other applications 225, modules or devices.

Figure 5:
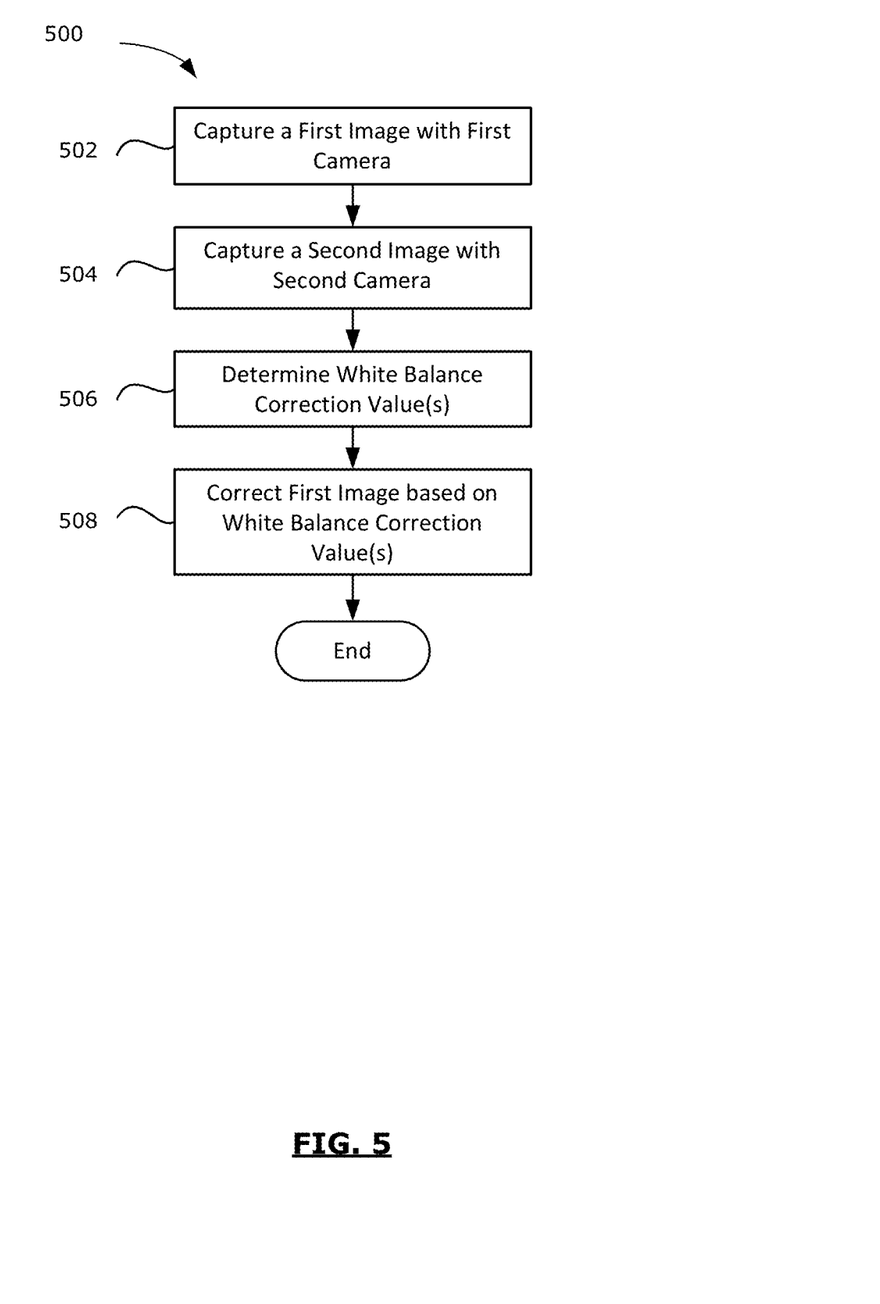
FIG. 5 is a flowchart illustrating an example method of auto-white balancing in accordance with example embodiments of the present disclosure.

Referring to FIG. 5, a flowchart of an example method 500 of auto-white balancing is illustrated.

At 502, the electronic device 201 captures a first image with a first camera 253*a* associated with the electronic device and, at 504, the electronic device 201 captures a second image with a second camera 253*b* associated with the electronic device 201. While the flowchart illustrates the capture of the first image and the second image as occurring consecutively, in practice, the images are captured at the same time or at approximately the same time. Since the first image and the second image are captured at approximately the same time, the first image and the second image are temporally related. By capturing the images at approximately the same time, the electronic device 201 may ensure that the environmental conditions do not change between the time when the first image was captured and the time that the second image was captured. Accordingly, in at least some embodiments, the first image and the second image are captured simultaneously.

The first camera 253*a* and the second camera 253*b* that are used at 502 and 504 to capture the first image and the second image may, in some embodiments, be oriented to obtain images of subjects at a common side of the electronic device 201. For example, the first camera 253*a* and the second camera 253*b* may have the orientation illustrated in FIG. 2, or a similar orientation. This orientation may allow the cameras to operate in another operating mode (i.e. apart from the operating mode depicted in FIG. 5) in which stereoscopic images may be obtained by using both of the cameras. This alternate operating mode may be referred to as a stereoscopic or 3D operating mode.

In other example embodiments, the first camera 253*a* and the second camera 253*b* may be opposite facing cameras. For example, the first camera 253*a* and the second camera 253*b* may have an orientation of the type illustrated in FIGS. 3 and 4 and described above with reference to those figures. For example, in some embodiments, the first camera 253*a* is a rear-facing camera and the second camera 253*b* is a front facing camera. In other embodiments, the first camera 253*a* is a front-facing camera and the second camera 253*b* is a rear-facing camera.

After the first image and the second image are obtained, these images may be analyzed in order to provide automatic white balancing to the first image. Accordingly, at 506, the electronic device 201 may determine one or more white balance correction values for the first image by analyzing the first image and the second image. The white balance correction value(s) represent the effect of lighting conditions on the first image and the second image. That is, the white balance correction value(s) represent the deviation of whites in the image from true white.

At 506, both the first image and the second image are analyzed. More particularly, even where the electronic device 201 is performing auto-white balancing on the first image and not the second image, it may use the second image to perform the white balancing. The second image may provide additional information about the effect of lighting conditions on the white balance of the first image.

Accordingly, in at least some embodiments, at 506 the electronic device 201 performs a multi-image analysis by analyzing each pixel of the first image and the second image. In some embodiments, each pixel may be analyzed irrespective of source. That is, each pixel may be used in the same way irrespective of whether it was a pixel contained in the first image or whether it was a pixel contained in the second image. In other embodiments, the pixels from both images may be used but they may be attributed different weights depending on whether they are associated with an image obtained at the first camera or an image obtained at the second camera. For example, pixels from a first image (obtained from the first camera) may be given greater weight than pixels from a second image (obtained from the second camera).

The multi-image analysis may allow the electronic device 201 to determine the white balance correction value(s). More particularly, the white balance correction value(s) may provide a collective measure of the degree to which both the first image and the second image require correction for the effect of lighting conditions.

In some embodiments, the white balance correction value(s) may be determined by identifying a region of one of the images that is lighter (i.e. more white) than any other regions in either the first image or the second image. For example, the lightest pixel in both images may be identified. Then, the white balance correction values may be determined based on the colour identified in that region. For example, the electronic device 201 may determine the degree to which the identified region deviates from true white. For example, the electronic device 201 may assume that the lightest region is supposed to represent a white region and may determine the amount by which this region deviates from true white.

In some embodiments, the white balance correction value(s) may be determined by obtaining an average measure of colour across both the first image and the second image. For example, in some embodiments, the electronic device 201 may average each pixel across both the first image and the second image irrespective of which image included the pixel. Then, the electronic device may determine the one or more white balance correction values based on the difference between the average measure of colour and middle gray. That is, the electronic device 201 may assume that the average colour in a complex image should be middle gray if the image is properly balanced. By determining the degree to which the images deviate from middle gray, correction may be performed on the first image.

After the electronic device 201 has (at 506) analyzed the images to determine the amount of white balancing that is required, at 508 the electronic device 201 corrects one or more images captured by the first camera based on the white balance correction value(s) determined at 506. For example, the first image obtained at 502 may be corrected. Accordingly, at 506, auto-white balancing may be applied to the first image to correct the colours in the first image. That is, the effect of lighting conditions may be corrected so that the colours in the first image appear more realistic. The auto-white balancing may be an automatic process which does not rely on user input. After the first image has been corrected, the corrected image may be stored in place of the previously uncorrected image.

Other features associated with the second image obtained using a second camera may be useful when auto white balancing a first image obtained using a first camera. For example, face detection may be used on an image obtained at a front-facing second camera and a skin tone associated with the detected face may be analyzed in order to determine the degree to which the skin tone deviates from a true representation. Since the electronic device 201 may often be used by the same person, the skin tone should be relatively similar across all images obtained at the front facing camera. Accordingly, when an image is captured at the rear facing first camera, the electronic device may also capture an image at a front facing second camera and may determine the degree to which the skin tone of a face in the image obtained at the second camera differs from its norm. This determination may be made, for example, by comparing the skin tone to archived images or information about the skin tone of faces in previously captured images obtained at the front facing second camera. A facial recognition algorithm may be employed in some embodiments to ensure that the skin tone captured in the image obtained at the second camera is only compared to the skin tone for the same face in previously captured images.

After the electronic device 201 determines the degree to which the skin tone deviates from its true color, the electronic device 201 may use this information to perform auto-white balancing on the image captured at the rear facing camera.

Figure 6:
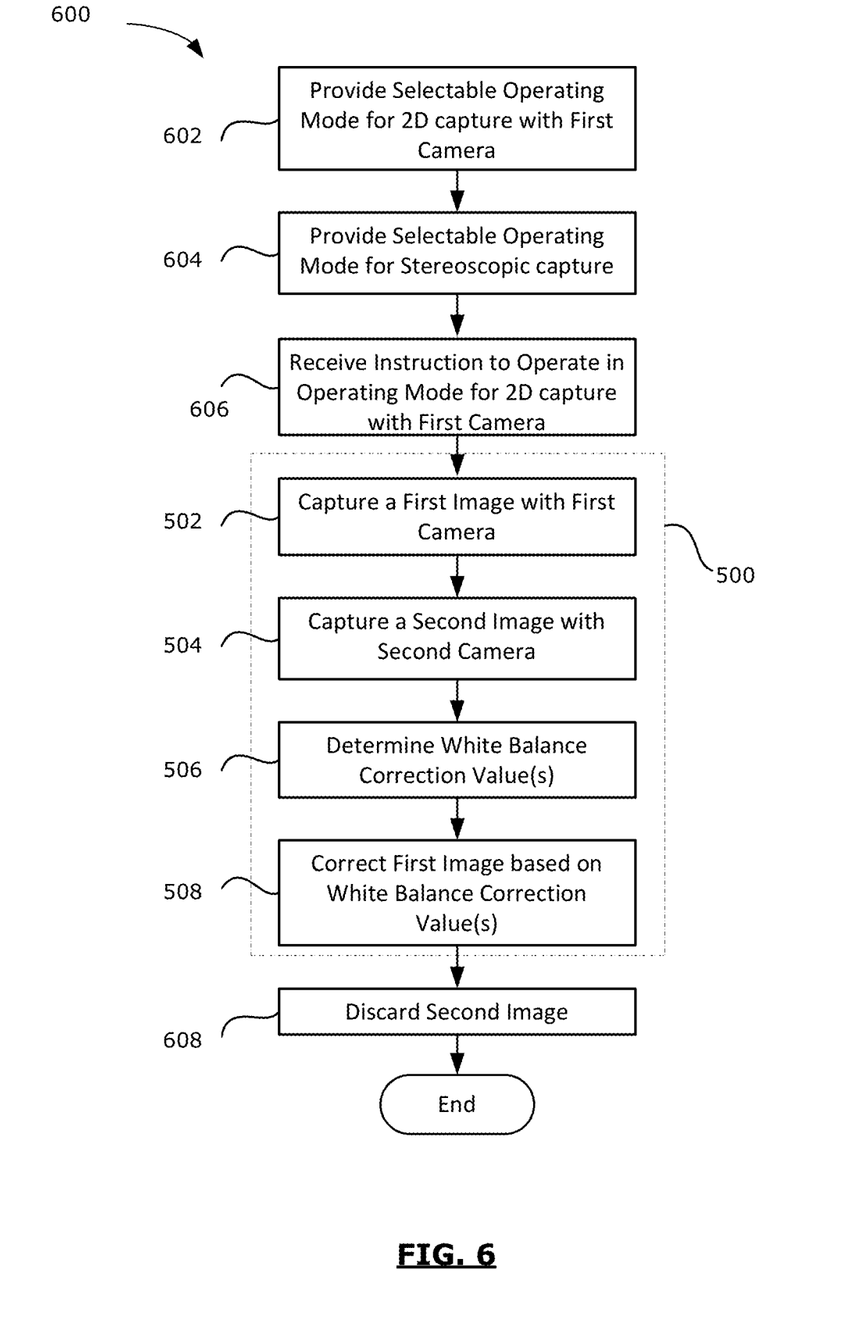
FIG. 6 is a flowchart illustrating an example method of auto-white balancing in accordance with example embodiments of the present disclosure.

Referring now to FIG. 6, a further example of a method 600 of auto-white balancing is illustrated in flowchart form. The method 600 includes many features discussed above with reference to the method 500 of FIG. 5. The discussion of these features will not be repeated at length.

As illustrated in FIG. 6, the auto-white balancing techniques described above may be used when the electronic device 201 is operating in an operating mode configured for capture of a two dimensional image using the first camera 253a.

Accordingly, at 602, a selectable operating mode for two dimensional capture with a first camera is provided on the electronic device 201.

The electronic device 201 may also be configured to allow the cameras to be operated in another operating mode. For example, as discussed above with reference to FIG. 2, in some embodiments, the first camera 253a and the second camera 253b may be similarly oriented cameras. That is, the first camera and the second camera may be oriented to obtain images of subjects at a common side of the electronic device 201. In such embodiments, the first camera 253a and the second camera 253b may be disposed in spaced relation to one another. That is, there may be a distance between the cameras. In at least some such embodiments, at 604, the electronic device 201 may provide a selectable operating mode on the electronic device for obtaining stereoscopic data using the first camera and the second camera.

Accordingly, in the embodiment of FIG. 6, the electronic device 201 is configured to operate in a plurality of operating modes. One of those operating modes is for 2D capture using the first camera, and another one of those operating modes is for 3D capture (i.e. stereoscopic capture) using both the first camera and the second camera.

In at least some embodiments, the auto-white balancing of the method 500 of FIG. 5 is performed in response to receiving an instruction to operate in the 2D operating mode. That is, at 606, an instruction is received to operate in the operating mode for capturing a two dimensional image using the first camera 253a and, in response, the method 500 is performed. More particularly, when the electronic device 201 is operating in the 2D operating mode that is configured for capturing a two dimensional image using the first camera 253a, a first image is captured (at 502) and a second image is also captured (at 504). In this operating mode, the capture of the second image may be hidden from the user of the electronic device 201. That is, the user may not know that the second image is being utilized.

The white balance correction value(s) for correcting the first image may be determined at 506 using both the first image and the second image (e.g. in the manner described above with reference to FIG. 5) and the first image may be corrected (at 508) using the white balance correction value(s) (e.g. in the manner described above with reference to FIG. 5).

After the white balance correction values are determined, the second image may be discarded (at 608). That is, the second image may be deleted from memory associated with the electronic device 201. The corrected first image may, however, be retained in memory of the electronic device.

Figure 7:
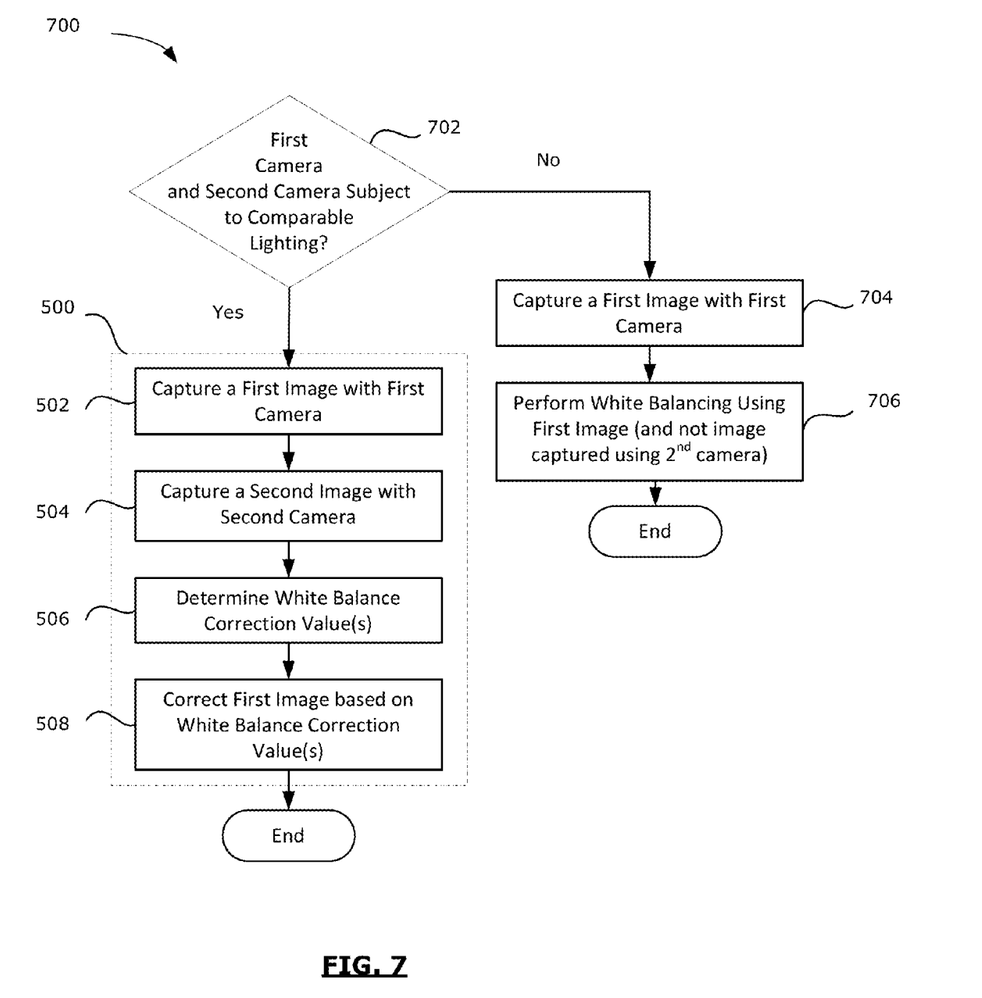
FIG. 7 is a flowchart illustrating an example method of auto-white balancing in accordance with example embodiments of the present disclosure.

Referring now to FIG. 7, a further example method 700 of auto-white balancing is illustrated in flowchart form. The method 700 includes many features discussed above with reference to the method 500 of FIG. 5. The discussion of these features will not be repeated at length.

The method 500 assumes that the lighting conditions which affect the first image and the second image are approximately the same. While this assumption may be suitable when the first image and the second image are captured at approximately the same time using similarly facing cameras, in other camera orientations, this assumption may be inaccurate in some environments. For example, in embodiments such as those discussed above with reference to FIGS. 3 and 4 in which the first camera 253a and the second camera 253b face opposite directions, one of the cameras may, for example, be directed at a window while the other of the cameras is directed away from the window. In such scenarios, the first camera 253a and the second camera 253b may not be subject to similar lighting conditions.

Accordingly, in at least some embodiments, a method 700 includes, at 702, determining whether the first camera and the second camera are subject to comparable lighting conditions. This determination may, for example, rely on input from sensors which sense environmental conditions associated with the cameras. For example, a light meter associated with the first camera and a light meter associated with the second camera may be used to determine whether the cameras are subject to comparable lighting conditions. The difference in lighting conditions may be determined and, when the difference exceeds a predetermined threshold, then the electronic device may determine that the first camera and the second camera are not subject to comparable lighting conditions.

In some embodiments, the electronic device 201 may be configured to automatically determine exposure times for each of the cameras. In at least some such embodiments, these exposure times may be used when determining whether the first camera and the second camera are subject to comparable lighting conditions. That is, an exposure time associated with the first camera and an exposure camera associated with the second camera may be compared to determine whether the first camera and the second camera are subject to comparable lighting conditions. The exposure times may, in at least some embodiments, be automatically set by the camera when the electronic device is operating in an automated mode in which the electronic device makes determinations regarding appropriate camera settings.

If it is determined, at 702, that the first camera and the second camera are subject to comparable lighting conditions, then the features of the method 500 may be provided. For example, at 502, a first image is captured using a first camera and, at 504, a second image is captured using a second camera. Then, at 506, one or more white balance correction values are determined which may be used at 508 to correct the first image.

If, however, it is determined that the first camera and the second camera are not subject to comparable lighting conditions, then at 704 a first image may be captured using the first camera 253a and at 706, white balancing may be performed on the first image captured at 704 by analyzing the first image but not an image captured using the second camera (i.e. a second image obtained using the second camera is not used to white balance an image obtained using the first camera if the lighting conditions are too different).

In some example embodiments (not shown in FIG. 7), the second camera may be used to assist the setting of an exposure time associated with the first camera. For example, the second camera may be used to detect an environmental condition that may result in underexposure of images captured at the first camera. For example, if the auto-exposure algorithm that sets the exposure time for the first camera selects a considerably lower exposure time (i.e. an exposure time that is lower by at least a threshold amount) than is selected for the second camera, then an image analysis may be performed on an image obtained at the first camera. If the image analysis determines that the image is too dark (e.g. if it is determined that at least a threshold amount of the image is darker than a threshold), then the electronic device may determine that the first camera is likely underexposing a subject in front of a bright background. When the electronic device determines that such underexposure exists, the exposure time associated with the first camera may be increased to compensate.

Flicker Detection

The electronic device 201 may be configured, in at least some embodiments, to utilize the availability of multiple cameras to perform flicker detection. As noted previously, digital cameras may also be affected by flicker. Flicker is caused due to the presence of light sources that are powered by alternating current (AC) mains. Such light sources may emit light that varies in brightness based on the mains frequency of the AC mains. Such variations are not detected by the human eye, but may be detected by an image sensor of a digital camera. Such variations may produce a series of alternating dark and light bands.

Figure 8:
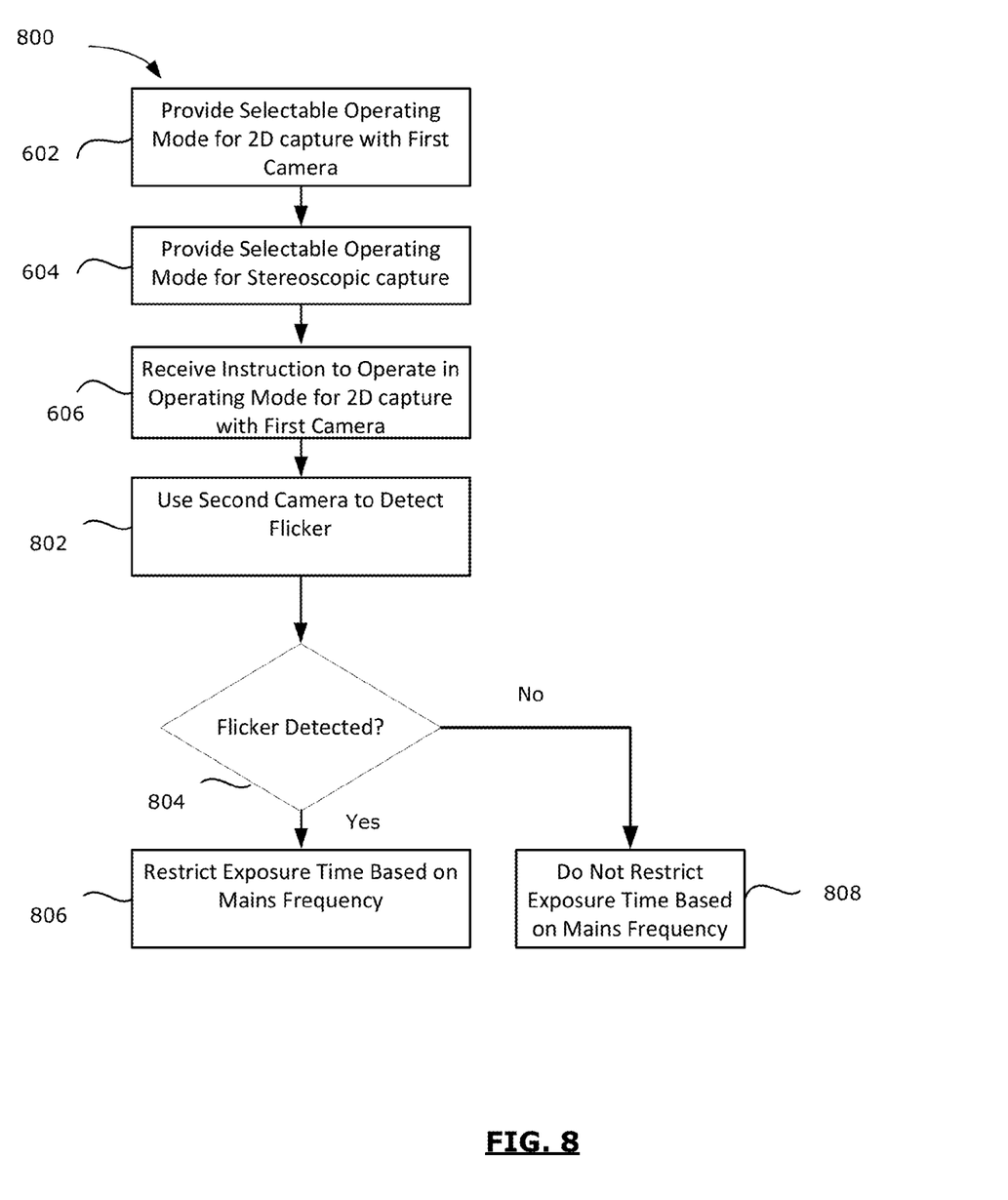
FIG. 8 is a flowchart illustrating an example method of detecting flicker in accordance with example embodiments of the present disclosure.

Referring now to FIG. 8, a method 800 of using a second camera 253b to detect a flicker source is illustrated in flowchart form.

At 602, a selectable operating mode for two dimensional capture with a first camera is provided on the electronic device 201. 602 is described in greater detail above with reference to FIG. 6.

The electronic device 201 may also be configured to allow the cameras to be operated in another operating mode. For example, as discussed above with reference to FIG. 2, in some embodiments, the first camera 253a and the second camera 253b may be similarly oriented cameras. That is, the first camera and the second camera may be oriented to obtain images of subjects at a common side of the electronic device 201. In such embodiments, the first camera 253a and the second camera 253b may be disposed in spaced relation to one another. That is, there may be a distance between the cameras. In at least some such embodiments, at 604, the electronic device 201 may provide a selectable operating mode on the electronic device for obtaining stereoscopic data using the first camera and the second camera. 604 is described in greater detail above with reference to FIG. 6.

In other embodiments (which are described above with reference to FIGS. 3 and 4), the second camera may be oriented on an opposite face of the electronic device than the face on which the first camera is oriented. Accordingly, 604 may not be provided in some example embodiments.

When an instruction is received (at 606) instructing the electronic device to operate in an operating mode for two dimensional capture with a first camera, the electronic device 201 may (at 802) utilize the second camera for flicker detection. That is, the second camera 253b is used to detect the presence of a flicker source when the electronic device is operating in the operating mode for capturing two dimensional images using the first camera.

In order to detect a flicker source, at 802, the electronic device 201 may adjust the exposure time for the second camera to a value that is incompatible with a local mains frequency. For example, to be compatible with the mains frequency of 60 Hz in North America, an exposure time is set to a multiple of 8.33 ms. To be incompatible, the exposure time is set to another value (i.e. a value that is not a multiple of 8.33 ms). After the exposure time is adjusted, an image is captured at the second camera 253b. Then, the captured image is analyzed to detect an effect associated with the presence of flicker. For example, the electronic device 201 may scan the image for the alternating light and dark bands that are characteristic of flicker. When the image captured using the second camera is found to contain the effect associated with the presence of flicker, the electronic device may determine that a flicker source is present. The captured image may then be discarded. To avoid the possibility that a user may view an image containing flicker, the image captured using the incompatible exposure time may not be displayed on a display 204 associated with the electronic device 201. That is, the image is analyzed and discarded without ever being displayed.

If, at 804, it is determined that a flicker source has been detected, then at 806 an exposure time associated with the first camera 253a may be restricted to values that are compatible with the local mains frequency.

If, however, a flicker source is not detected, then the electronic device 201 may, at 808, not restrict the exposure time for the first camera 253a based on the mains frequency. That is, the electronic device may allow an exposure time setting associated with the first camera to be set to values that are incompatible with the local mains frequency. Thus, when no flicker sources are present, the electronic device 201 utilizes a larger set of possible exposure times than when a flicker source is present.

By allowing the electronic device 201 to use exposure times that are not compatible with the mains frequency when no flicker source is detected, images with less noise may be obtained. More particularly, when an exposure time is restricted to avoid flicker, a camera's ISO setting may be used to compensate for the gap between the exposure times. The use of ISO may introduce noise into captured images. However, according to the method 800 described above, when no flicker source is present, ISO does not need to be used to compensate for exposure times that are not available. Thus, less noise may be introduced into images.

The method 800 of FIG. 8 may be performed, in some embodiments, together with another one or more of the methods 500, 600, 700 described above with reference to FIGS. 5 to 7.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of automatically white balancing an image, the method comprising:
   capturing a first image using a first camera associated with an electronic device and capturing a second image using a second camera associated with the electronic device, the first image and the second image being temporally related;
   determining one or more white balance correction values for the first image by analyzing the first image and the second image, the white balance correction value representing the effect of lighting conditions on the first image and the second image; and
   correcting one or more images captured by the first camera based on the white balance correction value,
   wherein determining one or more white balance correction values for the first image by analyzing the first image and the second image comprises performing a multi-image analysis by analyzing pixels of the first image and the second image to obtain the one or more white balance correction values and wherein the pixels of the first image and the pixels of the second image are attributed different weights in the multi-image analysis.

2. The method of claim 1, wherein correcting one or more images captured by the first camera based on the white balance correction value comprises: correcting the first image.

3. The method of claim 1, further comprising, prior to capturing the first image using the first camera and prior to capturing the second image using the second camera:
   providing, on the electronic device, a selectable operating mode for capturing a two dimensional image using the first camera,
   and wherein the first image and the second image are captured when the electronic device is in the operating mode for capturing the two dimensional image using the first camera.

4. The method of claim 3, further comprising, after determining the one or more white balance correction values:
   discarding the second image.

5. The method of claim 3, wherein the first camera and the second camera are oriented to obtain images of subjects at a common side of the electronic device and wherein the first camera and the second camera are disposed in spaced relation to one another, the method further comprising:
   providing a selectable operating mode on the electronic device for obtaining stereoscopic data using the first camera and the second camera.

6. The method of claim 1, wherein determining one or more white balance correction values for the first image by analyzing the first image and the second image comprises:
   identifying a region of one of the first image or the second images that is lighter than any other regions of the first image and the second image; and
   determining the one or more of the white balance correction values based on the colour in the identified region.

7. The method of claim 1 wherein determining one or more white balance correction values for the first image by analyzing the first image and the second image comprises:
   obtaining an average measure of colour across both the first image and the second image; and
   determining the one or more white balance correction values based on the difference between the average measure of colour and middle gray.

8. The method of claim 1, wherein the first camera is a rear-facing camera and the second camera is a front-facing camera.

9. The method of claim 1, further comprising, prior to correcting:
   determining that the first camera and the second camera are subject to comparable lighting conditions.

10. The method of claim 9, wherein determining that the first camera and the second camera are subject to comparable lighting conditions comprises:
    comparing the exposure time associated with the first camera and the exposure time associated with the second camera.

11. The method of claim 1, further comprising:
    determining that the first camera and the second camera are not subject to comparable lighting conditions; and
    when the first camera and the second camera are not subject to comparable lighting conditions, performing white balancing on one or more images captured with the first camera by analyzing the first image and not the second image.

12. The method of claim 1, further comprising:
    providing a selectable operating mode on the electronic device for capturing a two dimensional image using the first camera; and
    when the electronic device is operating in the operating mode for capturing a two dimensional image using the first camera, using the second camera to detect the presence of a flicker source.

13. The method of claim 12, wherein using the second camera to detect the presence of a flicker source comprises:
    adjusting an exposure time for the second camera to a value incompatible with a local mains frequency;
    after adjusting the exposure time, capturing the second image at the second camera;

analyzing the second image to identify an effect associated with the presence of flicker; and when the second image is found to contain the effect associated with the presence of flicker, determining that a flicker source is present.

14. The method of claim 12, further comprising:

when a flicker source is detected, restricting an exposure time setting associated with the first camera to values compatible with a local mains frequency; and when a flicker source is not detected, allowing an exposure time setting associated with the first camera to be set to values incompatible with the local mains frequency.

15. An electronic device comprising:

a first camera;

a second camera; and a processor connected to the first camera and the second camera, the processor configured to:

capture a first image using the first camera and capture a second image using the second camera, the first image and the second image being temporally related;

determine one or more white balance correction values for the first image by analyzing the first image and the second image, the white balance correction value representing the effect of lighting conditions on the first image and the second image; and     correct one or more images captured by the first camera based on the white balance correction value, wherein determining one or more white balance correction values for the first image by analyzing the first image and the second image comprises performing a multi-image analysis by analyzing pixels of the first image and the second image to obtain the one or more white balance correction values and wherein the pixels of the first image and the pixels of the second image are attributed different weights in the multi-image analysis.

16. The electronic device of claim 15, wherein correcting one or more images captured by the first camera based on the white balance correction values comprises: correcting the first image.

17. The electronic device of claim 15, wherein the processor is further configured to, prior to capturing the first image using the first camera and prior to capturing the second image using the second camera:

provide, on the electronic device, a selectable operating mode for capturing a two dimensional image using the first camera, and wherein the first image and the second image are captured when the electronic device is in the operating mode for capturing the two dimensional image using the first camera.

18. A non-transitory computer-readable medium comprising computer-executable instructions for performing a method comprising:

capturing a first image using a first camera associated with an electronic device and capturing a second image using a second camera associated with the electronic device, the first image and the second image being temporally related;

determining one or more white balance correction values for the first image by analyzing the first image and the second image, the white balance correction value representing the effect of lighting conditions on the first image and the second image; and correcting one or more images captured by the first camera based on the white balance correction value, wherein determining one or more white balance correction values for the first image by analyzing the first image and the second image comprises performing a multi-image analysis by analyzing pixels of the first image and the second image to obtain the one or more white balance correction values and wherein the pixels of the first image and the pixels of the second image are attributed different weights in the multi-image analysis.

* * * * *